March 4, 1969 J. STROSZYNSKI 3,431,139
PROCESS AND APPARATUS FOR SUCCESSIVELY WITHDRAWING INDIVIDUAL
ARTICLES FROM A STACK
Filed July 18, 1966
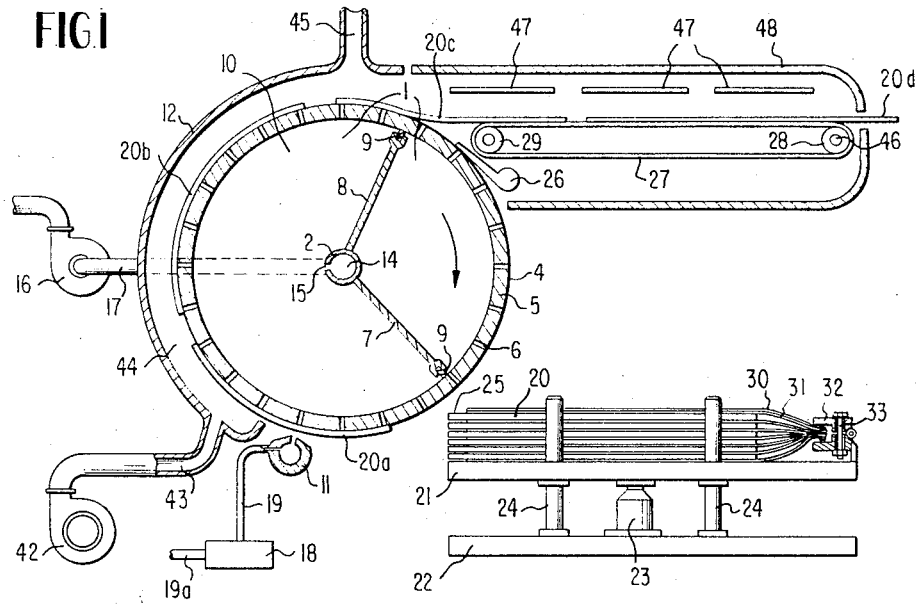
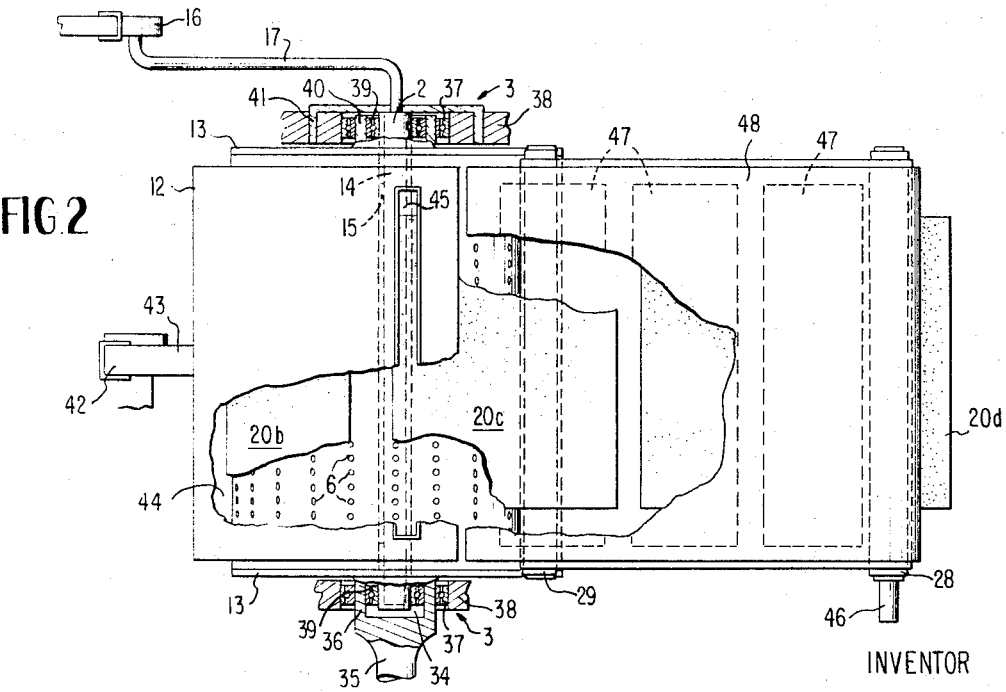
INVENTOR
JOACHIM STROSZYNSKI
BY *James E. Bryan*
ATTORNEY United States Patent Office 3,431,139
Patented Mar. 4, 1969

3,431,139
PROCESS AND APPARATUS FOR SUCCESSIVELY WITHDRAWING INDIVIDUAL ARTICLES FROM A STACK
Joachim Stroszynski, Wiesbaden, Germany, assignor, by mesne assignments, to Azoplate Corporation, Murray Hill, N.J.
Filed July 18, 1966, Ser. No. 565,800
Claims priority, application Germany, July 21, 1965, K 56,669
U.S. Cl. 117—119.8                                10 Claims
Int. Cl. B44d *1/08;* B05c *11/12;* B65h *3/10*

ABSTRACT OF THE DISCLOSURE

A stack of articles includes a plurality of individual flexible articles to be removed which are separated from one another by interleaved smooth films. The leading edges of the articles are uncovered, and the films extend beyond the opposite trailing edges of the articles and are fixed to the supporting structure. A hollow rotatable drum having subatmospheric pressure therein has apertures in the periphery thereof for removing the topmost article from the stack, and means is provided adjacent the periphery of the drum for coating an article and then drying such coated article while adhered to the drum, whereupon the article is removed from the drum and conveyed to a remote position.

---

This invention relates to a process and apparatus for successively withdrawing individual articles from a stack.

The invention provides a process for successively withdrawing individual rectangular, flat, flexible articles from the top of a regular stack of such articles, wherein the stack is caused to approach a horizontally mounted rotary cylindrical drum having a perforated cylindrical jacket with internal means for applying suction at the outer surface of the jacket through the perforations, the stack being held below the axis of the drum with a leading edge or margin of the uppermost article adjacent the outer surface and parallel to the axis, and the drum is so rotated that its surface moves generally downwardly with respect to the leading edge whereby upon application of suction the uppermost article is drawn by its leading edge onto the surface of the drum to rotate in contact with the surface, the stack of articles being raised towards the drum so that successive articles can be withdrawn from the stack in a similar manner.

The process is applicable to all types of articles of the nature specified, such as plastic films, metal foils or sheets, or paper sheets. The articles may be of single thickness or may consist of a plurality of thicknesses, as in the case of flat bags. By a regular stack is meant a stack of articles of which at least all the leading edges are superposed. If the articles are of the same size they will be in register in the stack, but it is not necessary that they be of the same size as long as the stack is stable or can be held stable.

The articles all should be of such a size that they can be entirely accommodated on the perforated surface of the drum, which, if desired, may occupy only a part of the whole surface. The process suitable may be performed so that one article is withdrawn for each revolution of the drum. If the article is shorter than the perforated periphery of the drum, part of this periphery preferably is transversely masked, for example by paper, plastic film or metal sheet, to avoid unnecessary suction of air through the drum. It is also possible to apply the process to articles which are narrower than the perforated surface of the drum but again it is preferable to mask perforations outside the area of the articles, for example by encircling masking strips.

During the process one article after another is automatically lifted from the stack. Whether the individual articles are pressed onto the drum entirely separately or overlapping one another to a greater or lesser extent depends on the weight of the individual articles, their distance from the perforated surface of the drum, the magnitude of the subatmospheric pressure in the inside of the drum, the magnitude and arrangement of the perforations in the jacket of the drum and the angular position of the stack relative to the drum. By a suitable selection of the above factors, an overlap of the desired width can be maintained or the sheets can be made to follow one another directly or with a suitable spacing.

In the process the stack of articles is raised by the same amount as it loses in height due to withdrawal of articles from the top. The stack can be raised continuously or intermittently. For example, during the process the stack can be raised continuously at a particular rate, or while a sheet is withdrawn it can be raised stepwise by a compensating amount at an arbitrary time during this operation. Instead, when it is possible to withdraw more than one article successively with the remainder of the stack in the same position, this can be done and the stack can be raised by the requisite amount only after more than one article has been removed.

When the articles are sheets of uniform size, they advantageously may be interleaved with smooth film, the leading edges or margins of the sheets being exposed and the interleaved films being extended at their rear edges which are held against withdrawal with the sheets.

The process is particularly advantageous when it is desired to subject an article on the drum to a treatment during rotation. Such a treatment may include a uniform coating treatment in which the outer surface of the article is coated with a medium in a volatile liquid and the liquid is removed by evaporation. A plastic surface may be irradiated to produce cross-lnking for hardening or oxidized to improve the acceptance of printing ink. Bags may be printed by a rotary offset process or may be filled with goods.

The invention also provides an apparatus for performing the process above described, the apparatus including a drum as specified, support means for a stack of articles, means for applying suction, and means for raising the support means, both in the manner set forth above. Preferably, the drum has a stationary hollow shaft through which suction can be applied to the interior of the drum. Advantageously, in order to provide for detachment of the articles from the drum, stationary means are provided within the drum for dividing a suction sector of the interior of the drum from a normal or increased pressure sector. Then stationary means, such as an air blast nozzle, may be located in relation to the normal or increased pressure sector for assisting in the detachment of the articles from the drum. Conveyor means may be positioned to receive detached articles and to convey them away from the drum. For carrying out a treatment of an article on the drum, the apparatus may include coating means mounted outside the drum in a location at which suction is applicable to the drum surface. A drying device then may extend alongside a path to be taken by an article after leaving the coating means.

Apparatus according to the invention is further illustrated in the accompanying drawings in which:

FIGURE 1 is a view in elevation, partly in section, and
FIGURE 2 is a plan view corresponding to FIGURE 1 with parts shown broken away.

Referring to the drawing, the apparatus as illustrated is used to coat sheets of material with a fluid coating medium and to dry the applied layer. In the apparatus shown, a drum 1 is mounted in bearings 3 on a fixed horizontal shaft 2 about which the drum 1 is rotatable.

At one end, part of the shaft 2 is enclosed in the hollow end 34 of a drive shaft 35; the hollow in the drive shaft is cylindrical. Between the inside a cylinder 36 around the hollow space and the shaft 2 there is a bearing ring 37, and between the outside of the cylinder and a seat 38 fixed to a support, there is another bearing ring 39. The hollow end of the drive shaft is fixed to one end wall 13 of the drum. The other end of the shaft 2 is also mounted in a seat 38 fixed to the support, again using two bearing rings 37 and 39; but at this end there is a cylindrical annular flange 40 between the two bearing rings 37 and 39 instead of the hollow end of the drive shaft. Also at this end the shaft 2 is fixed to the support by an anchoring means 41. When the apparatus is in operation, the drum 1 is rotated by the drive shaft 35 the drive mechanism of which is not shown.

The drum is carefully centered and the outer surface 4 of its cylindrical jacket 5 is very accurately circular at all radial sections. The jacket 5 is advantageously made of metal and its surface is preferably highly polished; the jacket 5 also is provided with perforations 6. These preferably extend around the entire drum 1 and over substantially the entire width, as shown, but for some purposes drums can be used of which only part of the jacket is provided with perforations.

Inside the drum two partitions 7 and 8 are mounted radially, extending from the shaft 2 towards the drum jacket 5. They are fixed to the shaft 2 rigidly and in a gas-tight manner and at their outer ends have packings 9 which form a seal between the partitions 7 and 8 and the jacket 5 of the drum. The partitions define a chamber 10 which comprises a stctor of the drum within which, 10 which comprises a sector of the drum within which, in turn, the leading edge of each one of a stack of sheets 20 is fed to the perforated surface of the drum. The sheets are coated by means of a coating nozzle 11 and dried by means of a drying device 12. The latter consists essentially of a fan 42, an air inlet line 43, a drying chamber 44 and an outlet pipe 45. The drum chamber 10 is bounded by the two partitions 7 and 8 and their packings 9, the shaft 2, the sector of the jacket 5 of the drum extending from the lower packing 9 over the part of the drum jacket passing the nozzle 11 to the other packing 9, and the end walls 13 of the drum 1. The end walls 13 are also sealed with respect to the bounding edges of the partitions 7 and 8 and the shaft 2. The shaft 2 has a longitudinal bore 14 and one or more radial bores 15 opening into it. The longitudinal bore 14 is connected to a suction line 17 which, in turn, is connected to a vacuum pump 16 or other device for producing a sub-atmospheric pressure, e.g. a vacuum vessel. The radial opening or openings 15 lead to the chamber 10. The coating nozzle 11 is mounted below the drum 1 and is connected to a pump 18 which feeds coating fluid by means of a line 19. The pump draws the coating solution through a feed line 19a from a container, not shown.

The sheets 20 to be coated are stacked up. The stack rests on a support 21 which can be adjusted in height with respect to a support base 22. The height can be varied, for example, by means of a hydraulic jack 23. The raising of the support 21 can be controlled in relation to the sheet feed means, for example by means of a known automatic feeler device, not shown. Guide columns 24 ensure parallel movement of the stack support. As the stack is raised, the edge 25 of one of the sheets 20, which edge is parallel to the axis of the drum, approaches a position on the jacket of the drum opposite the place where the chamber 10, which can be evacuated, begins inside the drum. The beginning of the low pressure chamber is preferably within the bottom third of the drum. However, before the uppermost sheet 20 reaches the drum as the stack is raised, its leading edge 25 is lifted due to the suction exerted through the perforations 6 and the sheet is carried along with the rotating drum so that it is drawn off the stack and gradually becomes positioned on the surface of the drum.

A succession of sheets are then carried past the nozzle 11 and the drying device 12. The sheet 20a which has just been coated and the sheet 20b with an applied coating partially dried, remain pressed onto the surface of the drum until the leading edge has passed the end of the chamber 10 when the sheets automatically gradually separate from the drum or are lifted off by a device 26, which may be an air nozzle blowing air between the drum jacket and the sheet. The sheet 20c leaving the drum is taken up by a conveyor which carries it away from the drum (note sheet 20d) and, after passing a series of radiating devices 47 mounted in a housing 48, delivers it as required. The conveyor comprises a conveyor belt 27 which runs over rollers 28 and 29 and advantageously moves with the same linear velocity as the outer surface 4 of the drum jacket. The conveyor belt can be driven, for example, by a drive mechanism, not shown, connected to a drive shaft 46 to which the rolller 28 is fixed so that this roller 28 drives the belt.

The sheets 20 in the stack preferably are separated from one another by interleaved smooth, antistatic plastic films 30. The films 30 are so located between the individual sheets that they leave the leading edge 25 of each sheet uncovered. They also project beyond the opposite edge in portions 31. The projecting portions 31 are held in a clamp 32 which forms part of the support 21 for the stack and consists of two clamping jaws forced together by a screw 33. The films positioned between the individual sheets stacked one above the other allow each sheet to slide easily when it is lifted from the remainder of the stack by the drum. The reduction in the friction by means of the films is advantageous since it simplifies the removal of the sheets from the stack and their removal can be regulated with greater sensitivity. The insertion of the films is especially advantageous in preventing the sheets from scratching one another as they are lifted from the stack.

It will be obvious to those skilled in the art that many modifications may be made within the scope of the present invention without departing from the spirit thereof, and the invention includes all such modfications.

What is claimed is:

1. An apparatus for successively withdrawing individual flexible articles from the top of a stack of such articles which comprises a hollow rotatable cylindrical drum, means for rotating the drum, a plurality of apertures in the periphery of the drum, means for producing a sub-atmospheric pressure in the drum, and means for moving the drum and the stack in proximity to each other whereby the topmost article is adhered to the drum surface by suction exerted through the apertures, said stack including a plurality of individual flexible articles, adjacent ones of the articles being separated from one another by interleaved smooth films, the films being positioned such that the leading edge of each article is uncovered, the films projecting beyond the opposite trailing edge of each article, said projecting portions of the films being fixed with respect to the stack.

2. Apparatus as defined in claim 1 wherein said films are formed of antistatic plastic material.

3. Apparatus as defined in claim 1 including a support for said stack, the means for affixing said projecting portions of the films with respect to said stack comprising clamping means supported by said support.

4. An apparatus according to claim 1 including means for subjecting an article adhered to the drum to a treatment.

5. An apparatus according to claim 1 including coating means and drying means positioned adjacent the exterior of the drum whereby articles adhered to the drum may be coated.

6. An apparatus according to claim 1 including means for detaching adhered articles from the drum.

7. An apparatus according to claim 6 in which the latter means includes stationary means mounted within the drum and forming sectors of different pressures.

8. A process for successively withdrawing individual flexible articles from the top of a stack comprising providing a plurality of such articles, separating adjacent articles from one another by interleaved smooth films positioned so as to leave the leading edges of each article uncovered and with the films projecting beyond the opposite trailing edges of the individual articles, holding the projecting portions of said films stationary with respect to the stack, moving the stack and a rotating cylindrical zone into proximity to each other, and adhering the topmost article of the stack to the zone by suction exerted through the cylindrical zone.

9. A process according to claim 8 in which the stack is moved toward the cylindrical zone.

10. A process according to claim 8 in which the articles are coated with a liquid coating material and dried while adhered to the cylindrical zone.

References Cited

UNITED STATES PATENTS

| | | | |
|---|---|---|---|
| 2,016,245 | 10/1935 | Henderson | 118—58 |
| 2,033,849 | 3/1936 | Mudd | 118—236 X |
| 3,013,900 | 12/1961 | Yezek et al. | |
| 3,025,052 | 3/1962 | Gutteling | 271—28 |

WALTER A. SCHEEL, *Primary Examiner.*

JOHN P. McINTOSH, *Assistant Examiner.*

U.S. Cl. X.R.

117—120; 118—58, 410; 271—28